April 3, 1928.
A. K. EPSTEIN ET AL
1,664,775
MAYONNAISE PRODUCT AND PROCESS FOR PRODUCING SAME
Filed April 28, 1926
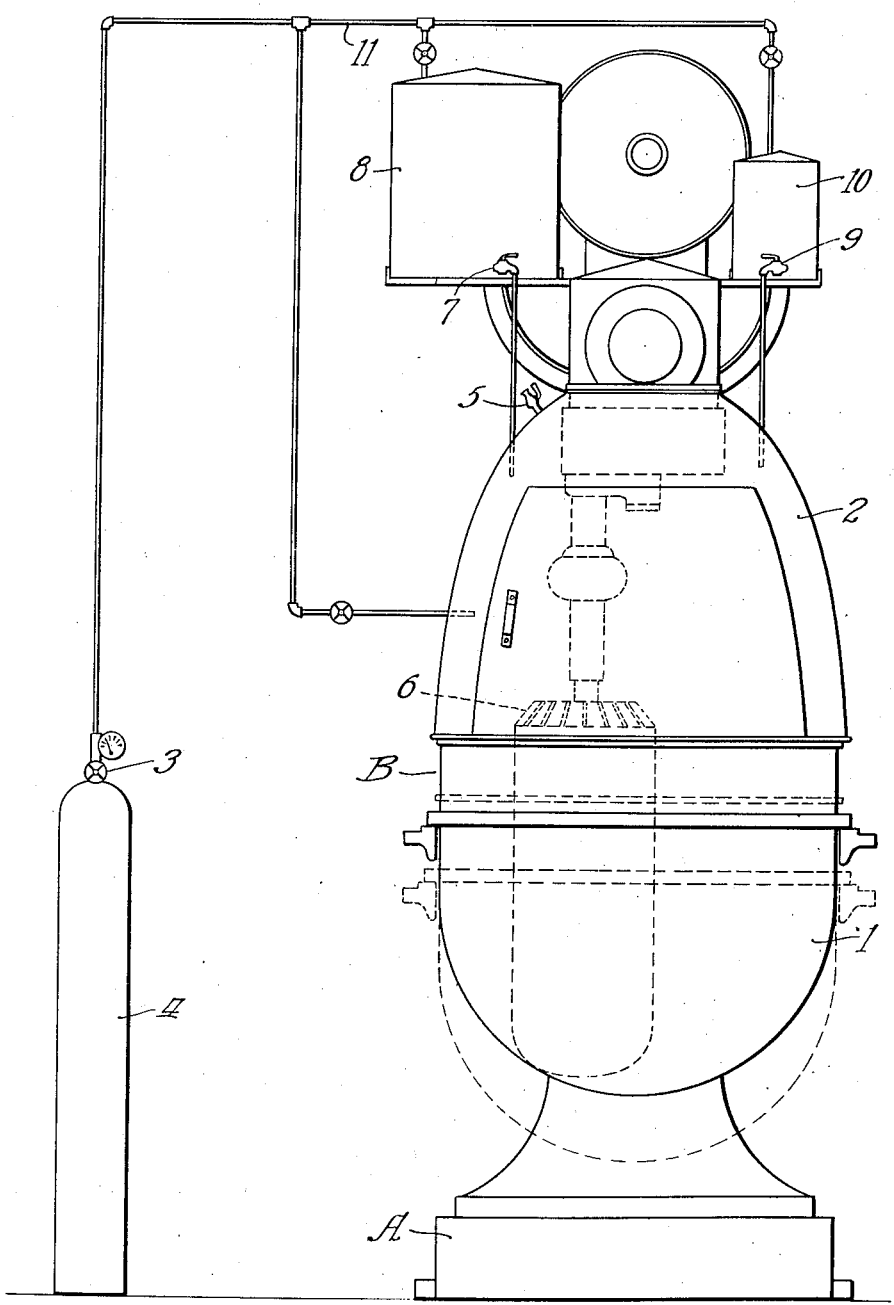
Inventors
Albert K. Epstein
Marvin C. Reynolds
George E. Mueller
Atty.

Patented Apr. 3, 1928.

1,664,775

UNITED STATES PATENT OFFICE.

ALBERT K. EPSTEIN, OF CHICAGO, AND MARVIN C. REYNOLDS, OF OAK PARK, ILLINOIS.

MAYONNAISE PRODUCT AND PROCESS FOR PRODUCING SAME.

Application filed April 28, 1926. Serial No. 105,064.

Our invention relates to food products and a process for producing the same, and has to do more particularly with the production of a mayonnaise product or dressing, an object being to provide an improved dressing of this character and a process for producing the same.

Heretofore in the making of mayonnaise products, liquid vegetable oils such as cotton seed oil, corn oil or olive oil were emulsified and dispersed in water by means of an emulsifying agent such as an egg material, or sometimes an additional emulsifying agent was added such as gum karaya, or dextrin-like gums. Flavoring ingredients were also added such as vinegar, lemon juice, mustard and other spices. In the making of the prior product the emulsifying agents were usually placed in a bowl and the other ingredients such as the vinegar, water, spices and oils added gradually while stirring or agitating the mass so as to subdivide the oil into fine particles to produce a product or emulsion of a smooth consistency.

We have discovered a new process for making such a food product and a new product produced thereby, wherein we disperse a chemically inert gas into the ingredients, thereby producing a new kind of mayonnaise dressing with distinctive properties and advantages. Generally stated, we simultaneously disperse a chemically inert gas and aqueous liquids and oil into the emulsifying agent such as the egg material. That is, we preferably introduce the gas and liquid flowing oils and other ingredients simultaneously into the vessel containing the egg material and stir the same, the gas forming an emulsion with the egg material and at the same time the oil forming an emulsion with the egg material.

For a better understanding of a method of carrying out our invention we have shown an apparatus in the accompanying drawing adapted for mixing the ingredients to form the mayonnaise dressing.

Referring more in detail to the apparatus illustrated, we have shown a stirring machine consisting of the usual base A having a rearwardly extending arm carrying the vessel B which includes the lower portion or receptacle 1 and a cover portion 2 suspended from the rear arm of the base A, so that the kettle or receptacle part 1 may be lowered to its dotted line position so that the material may be placed therein and removed therefrom. A well known form of stirring device 6 is positioned inside the container, being driven from a motor located at the top of the apparatus. Suitable containers from which the oil and other ingredients are fed are preferably placed above the container B, and to this end I show a tank 8 for receiving the oil and a tank 10 for receiving the aqueous ingredients such as water and vinegar, and which may also contain the condiments such as salt and other spices in solution or suspension. The containers 8 and 10 are connected with the main container B by suitable pipe connections which are controlled by stop valves 7 and 9.

As previously stated, we introduce an inert gas into the ingredients during the stirring thereof and preferably employ carbon dioxide contained in a tank 4 connected with the apparatus through a controlling valve 3. This tank 4 is connected with the main container through a valve 12 so as to feed the gas thereto and said tank is also connected with the liquid tanks 8 and 10 so that they are under pressure of the gas and thereby positively feed fluids therein into the container B which is under pressure of the gas from tank 4. The tanks 8 and 10 are preferably placed sufficiently high enough above the container B so as to secure enough head to positively feed the material, which is preferably assisted by the pressure from the gas tank 4.

In carrying out our invention we preferably place the necessary amount of emulsifying agent such as egg material in the bottom of the receptacle or bowl B and then tightly close the latter. In the tanks 8 and 10 we place the fluids which are to be fed to the container B, preferably separating the oil and aqueous liquids, the tank A receiving the oil and the tank 10 the other materials. We now open the stop cocks 13 and 12 to introduce a gas which is chemically inert towards oils and fats, such as carbon dioxide or nitrogen, preferably the former. This gas is introduced into the container B under a slight pressure, the excess of gas escaping through a vent 5 to indicate when the container B has been filled with the gas. We now start the agitator 6 and while the gas is still passing into the chamber B under slight pressure we introduce the other liquid flowing ingredients by opening the stop cocks 7 and 9 to regulate the flow or feed.

Thus the gas, oil and aqueous liquids are entering the receptacle B at the same time and while the agitation is taking place, dispersing the oils and gas into the other liquids preferably at normal or ordinary room temperature. Or in other words, we preferably introduce the ingredients at a temperature sufficiently high so as to keep the oils and aqueous liquids in a flowing condition during emulsification.

During the operation the action is such that with the simultaneous introduction of the liquid flowing oils and gas into the egg material, the gas forms an emulsion with the egg material and at the same time the oil forms an emulsion with the egg material. The gas becomes dispersed in the egg material and forms a foam-like mass, the particles of gas being surrounded with the envelope of egg material, forming a bubble. The oil becomes subdivided into the egg material and the two emulsions are thus made simultaneously. Thus the gas emulsion and oil emulsion are both stabilized by the egg product and are intermingled into one homogeneous mass.

After the desired amount of oil and other desired ingredients are added to the egg material, which is preferably the yolk of the egg, and the emulsification has been completed, the various stop cocks are operated to stop the feed of gas and other ingredients. The container bowl 1 is then lowered so that the product may be removed therefrom and packed.

What we claim as new and desire to secure by United States Letters Patent is:—

1. The process for making a food product consisting of dispersing a chemically inert gas in an emulsion including edible oils in egg material at normal temperature, the amount of gas dispersed being greater than the amount soluble in the product.

2. The process for making mayonnaise dressing consisting of dispersing carbon dioxide in an emulsion including edible oils and egg material at a temperature sufficient to maintain the oil in a flowing condition, the amount of carbon dioxide dispersed being greater than the amount soluble in the product.

3. The process for making a mayonnaise product comprising emulsifying egg material, edible oils, aqueous condiments and an inert gas, by placing the egg material in a substantially closed container and feeding the oils, aqueous condiments and gas thereto while stirring the same in the container at a temperature sufficiently high to maintain the oil in flowing condition.

4. A food product in the form of a fatty edible emulsion including liquid edible oil fluid at ordinary room temperature, condiments, and carbon dioxide, emulsified in an aqueous substance including egg material as an emulsifying agent, in which a larger amount of carbon dioxide is present than that soluble in the product, the resultant product being of a jelly-like consistency at ordinary room temperature.

5. A food product in the form of a fatty edible emulsion including liquid edible oil fluid at ordinary room temperature, condiments, and inert gas, emulsified in an aqueous substance including egg material as an emulsifying agent, in which a larger amount of carbon dioxide is present than that soluble in the product, the resultant product being of a jelly-like consistency at ordinary room temperature.

6. A process for making a food product comprising emulsifying simultaneously a chemically inert gas, egg material, an edible oil, an aqueous liquid at a temperature sufficient to maintain the oil in flowing condition during the emulsification.

7. The process for making a mayonnaise product comprising emulsifying egg material, edible oils, aqueous liquid and an inert gas by placing the egg material with sufficient moisture in a substantially closed container and feeding the oils, aqueous liquid and gas thereto while stirring the same in the container to a state of emulsification.

In witness whereof, we hereunto subscribe our names this 30th day of March, 1926.

ALBERT K. EPSTEIN.
MARVIN C. REYNOLDS.